United States Patent [19]

Calevich et al.

[11] Patent Number: 4,808,047
[45] Date of Patent: Feb. 28, 1989

[54] VARIABLE SPEED MOTOR TAPPING ATTACHMENT

[75] Inventors: Thomas J. Calevich, Wickliffe; Lamont Hansen, Euclid, both of Ohio

[73] Assignee: Acme-Cleveland Corporation, Cleveland, Ohio

[21] Appl. No.: 100,721

[22] Filed: Sep. 24, 1987

[51] Int. Cl.⁴ ............................................. B23G 1/08
[52] U.S. Cl. ............................................ 408/14; 408/9
[58] Field of Search .................... 408/6, 9, 10, 11, 14, 408/15, 42, 43; 10/136 E, 136 R

[56] References Cited

U.S. PATENT DOCUMENTS

| | | |
|---|---|---|
| 976,880 | 11/1910 | Hunter . |
| 1,130,398 | 3/1915 | Gridley . |
| 2,161,548 | 6/1937 | Miller . |
| 2,236,440 | 2/1938 | Miller . |
| 2,268,944 | 11/1939 | Jones . |
| 2,376,164 | 5/1943 | Miller et al. . |
| 2,729,834 | 1/1956 | Emrick ............................ 408/9 |
| 3,123,847 | 3/1964 | Willis et al. ....................... 408/9 |
| 3,802,298 | 4/1974 | Thomson . |

Primary Examiner—John K. Corbin
Attorney, Agent, or Firm—Pearne, Gordon, McCoy & Granger

[57] ABSTRACT

A threading attachment is provided in the tooling area of a multiple spindle machine tool, wherein the tap holder is rotated by a motor which has an infinitely variable speed within a given range and includes a first speed for advance movements to tap workpieces. This advance movement is provided by a motive power unit to move the tap holder in the advance movement and also in a retract movement at the completion of tapping. The motor has a second variable speed condition to back the tap out of the workpiece. This threading attachment is modular in construction to permit it to be physically mounted in any of the spindle positions of the multiple spindle machine tool and to be capable of being utilized with machine tools of different frame sizes. The foregoing abstract is merely a resume of one general application, is not a complete discussion of all principles of operation or applications, and is not to be construed as a limitation on the scope of the claimed subject matter.

14 Claims, 4 Drawing Sheets and much of the mechanism in the gear box. This mechanism included a cam for longitudinal feed of the tap holder plus different gears for the advance and retract movements plus clutches to establish the advance and retract movements. Other manufacturers of multiple spindle machine tools also generally followed this practice of cam-driven movement and gears in the gear box, as shown in U.S. Pat. Nos. 2,161,548 and 2,236,440.

VARIABLE SPEED MOTOR TAPPING ATTACHMENT

BACKGROUND OF THE INVENTION

Many different tapping attachments have been utilized on multiple spindle automatic machine tools. The early units were typically such as those shown in U.S. Pat. No. 1,130,398, with the tap holder in the tooling area, and much of the mechanism in the gear box. This mechanism included a cam for longitudinal feed of the tap holder plus different gears for the advance and retract movements plus clutches to establish the advance and retract movements. Other manufacturers of multiple spindle machine tools also generally followed this practice of cam-driven movement and gears in the gear box, as shown in U.S. Pat. Nos. 2,161,548 and 2,236,440.

Some efforts were made to make tooling attachments which were more accessible in the tooling area, such as shown in U.S. Pat. No. 2,268,944, but these were still driven by cams and required two different motors and a differential to obtain the threading and unthreading motions.

Another attempt at a threading attachment which was primarily in the tooling area is shown in U.S. Pat. No. 2,376,164, which had a motor which could be speeded up for a fast traverse of the tap toward the workpiece and then slow speed for tapping, but the motor was reversed for tap withdrawal and ran at the same speed in reverse, and it also required a differential mechanism. U.S. Pat. No. 3,802,298 showed a unit head for a multiple station machine tool which had a feed motor and a separate traverse motor, plus a brake.

The typical threading attachment, such as shown in U.S. Pat. Nos. 2,161,548 and 2,236,440, had considerable mass, friction and inertia, so that with very small taps in a workpiece, the frictional drag was apparent by shaving on the front or rear flanks of the threads cut in the workpiece. Also, such threading attachments generally fit in only two of the perhaps six positions of the spindles of the multiple spindle machine, thus limiting their versatility. Still further, the typical threading units had only three tapping speeds for advance movement and two speeds for backing the tap out of the work, and this was for right-hand threads. If it was desired to make left-hand threads, then there were only two tapping speeds and three speeds for backing the tap out of the work. All of these meant difficult gear changes in a rather inaccessible place, usually within the gear box. In these prior art units, one merely chose the best gear ratios available, and this was not necessarily the best choice for the type of material and diameter of the tap.

SUMMARY OF THE INVENTION

The problem to be solved, therefore, is how to construct a threading attachment which avoids the limited versatility of the prior art.

This problem is solved by a tapping attachment for the tooling area of a multiple spindle machine tool comprising, in combination, a base adapted to be attached to the frame of a multiple spindle machine tool in a given spindle position of the machine tool, a rotatable tap holder, means movably mounting said tap holder on said base for motion relative to a spindle in said given position, said tap holder adapted to carry a tap for operation on a workpiece in said given spindle position of the machine tool, motive means having first and second conditions to move said tap holder in advance and retract movements, respectively, relative to a workpiece in said given spindle position, a motor connected to rotate said tap holder at infinitely variable speeds within a given range, including first and second speeds, a switch mounted to be actuated by an advanced position of said tap holder, and control means connected to said switch (a) to establish said motor first speed and said motive means first condition to tap an aperture in the workpiece, and (b) to establish said motor second speed and said motive means second condition to retract the tap holder and back the tap out of the workpiece.

Accordingly, an object of the invention is to provide a threading attachment which may be physically mounted in any of the six positions of the six-spindle multiple machine tool.

Another object of the invention is to provide a threading attachment which is a module solely within the tooling area of a multiple spindle automatic machine tool.

Another object of the invention is to provide a threading attachment wherein the tap may be rotated at an infinite variety of speeds within a given speed range for best tapping and retract conditions.

The prior art units were generally configured to be used with only a single frame size, and thus different threading attachments had to be constructed for each different frame size. Accordingly, another object of the invention is to provide another threading attachment which may be used with many different frame sizes of machine tools.

Other objects and a fuller understanding of the invention may be had by referring to the following description and claims, taken in conjunction with the accompanying drawing.

DESCRIPTION OF THE PREFERRED EMBODIMENT

Figure 1:
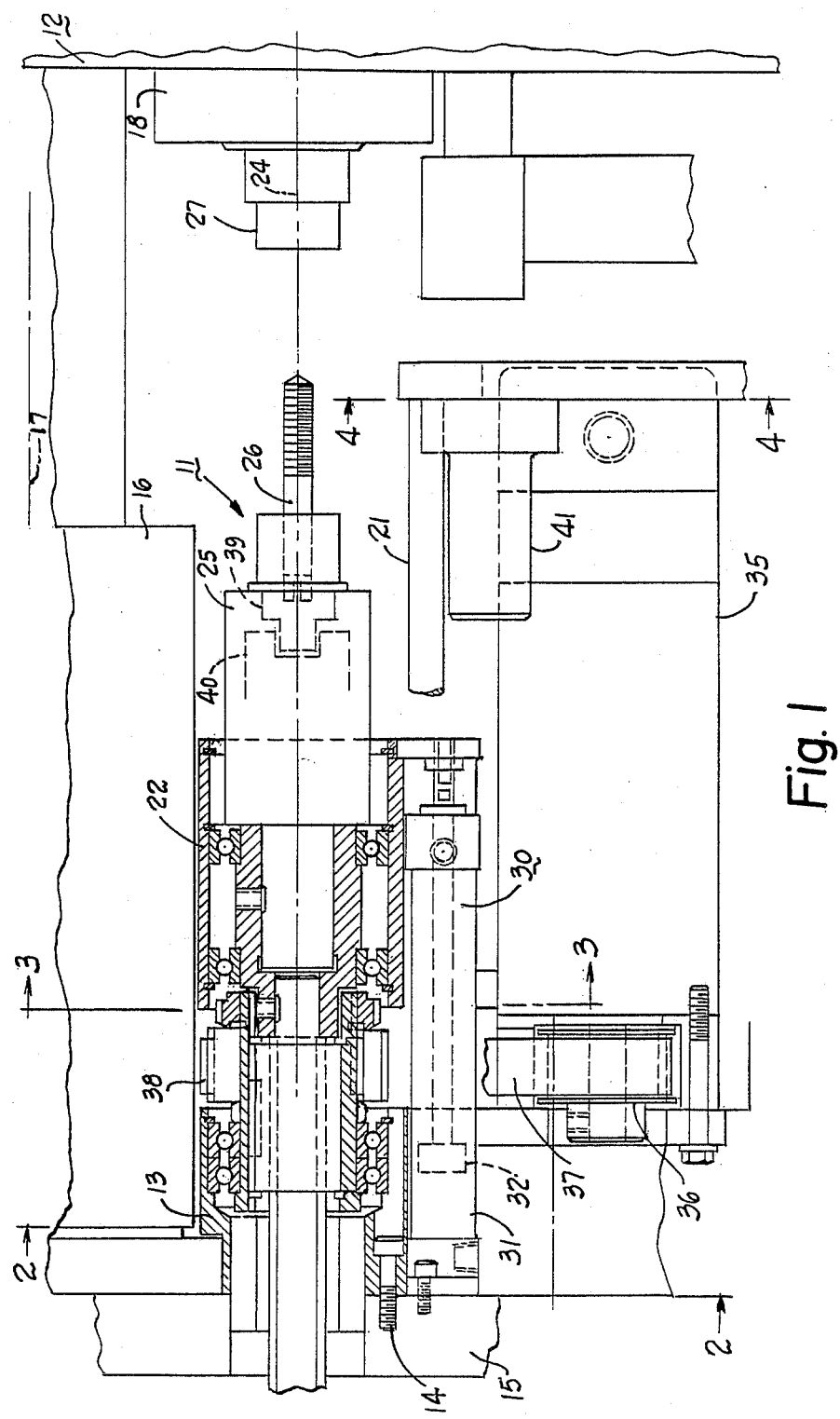
FIG. 1 is an elevational view of a threading attachment according to the invention.
Figure 2:
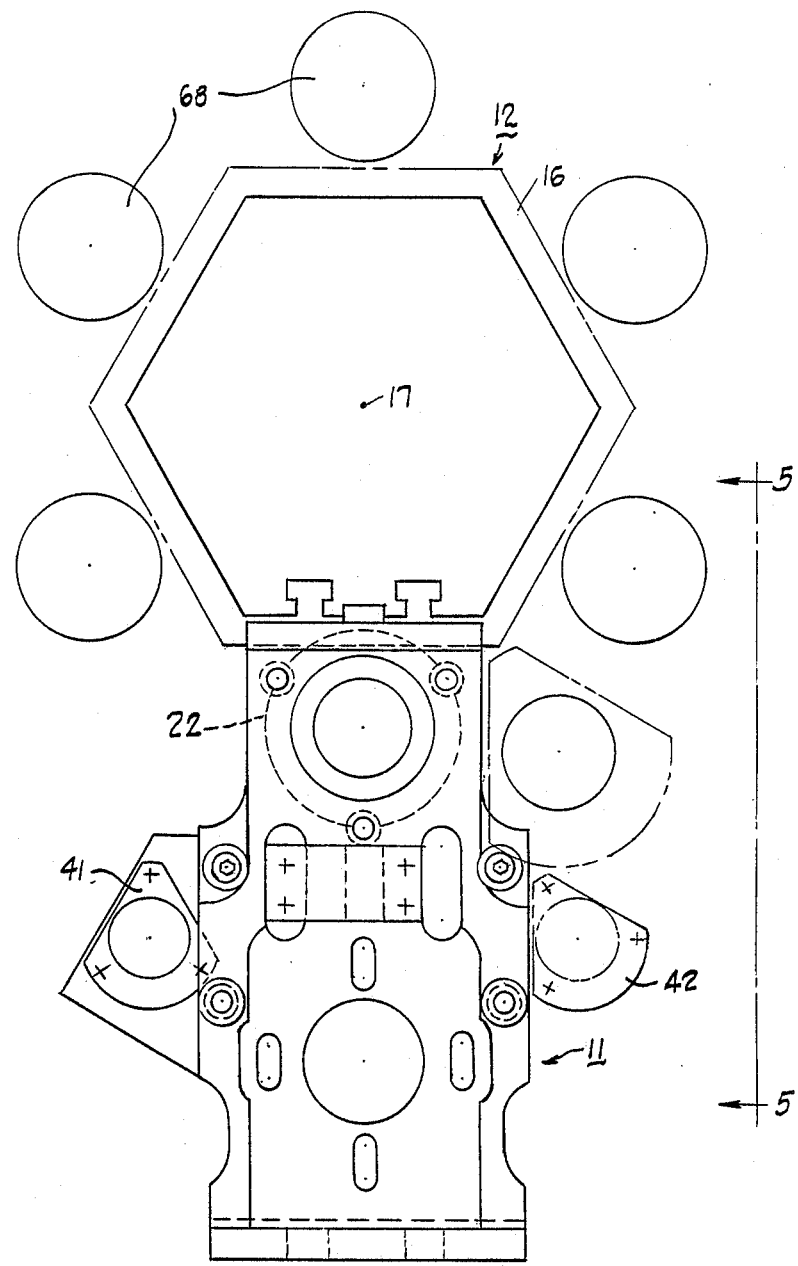
FIG. 2 is a sectional view on line 2—2 of FIG. 1.
Figure 4:
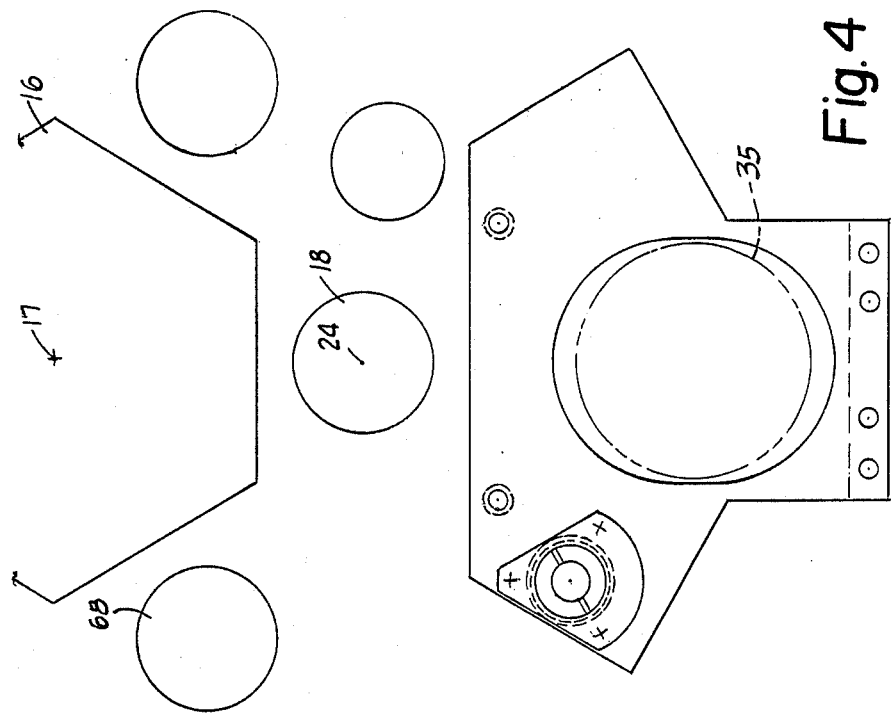
FIG. 4 is a sectional view on line 4—4 of FIG. 1.
Figure 3:
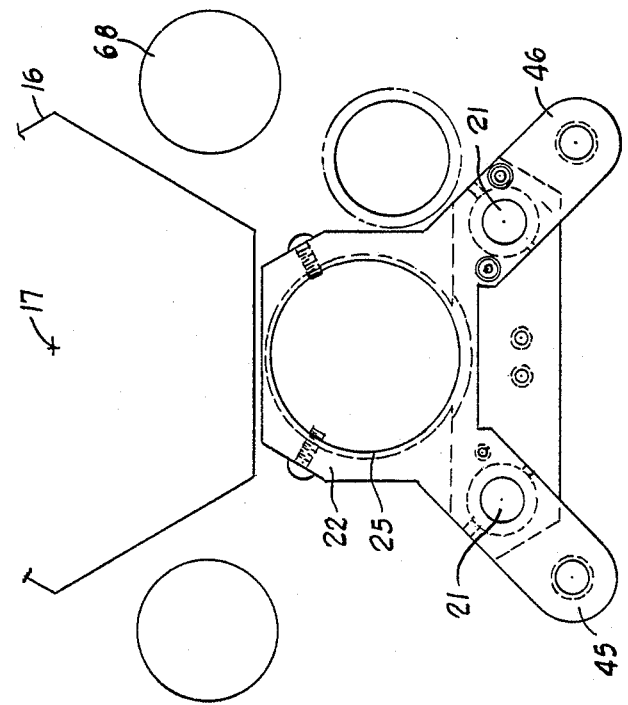
FIG. 3 is a sectional view on line 3—3 of FIG. 1.
Figure 5:
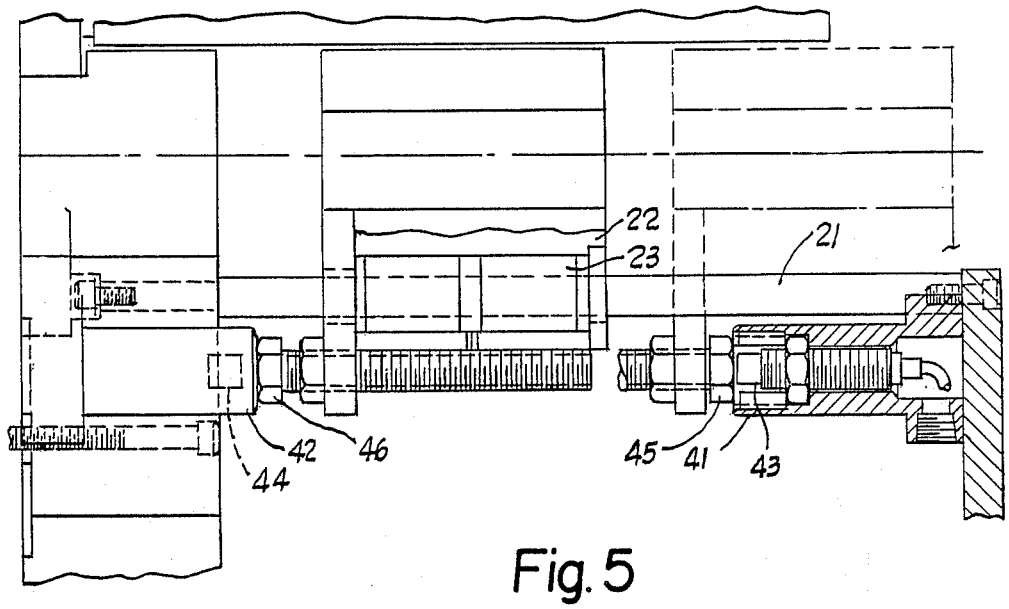
FIG. 5 is a sectional view on line 5—5 of FIG. 2.

FIGS. 1 to 5 generally show the construction of a threading attachment 11 which may be used with a multiple spindle automatic machine tool 12. The threading attachment 11 has a base 13 which may be secured with machine screws 14 to the machine tool 12, for example, at the gear box 15. As best shown in FIG. 2, the threading attachment is a module which fits close to the end tool slide 16 of the machine tool 12, but is not attached to it, and occupies only a 60-degree sector from the spindle carrier axis 17, so this module may be physically mounted in any of six positions for this six-spindle machine tool, and may be used for a given spindle position 18.

On the base 13, there are two tie rods 21 and a slide 22 is mounted for linear motion on these tie rods by means of ball bushings 23. This motion of the slide may provide cross-threading, but in this preferred embodiment the motion is parallel to the axis 24 of the given spindle 18. A rotatable tap holder 25 is journaled on this slide 22. The tap holder is adapted to mount any of several taps 26 of different sizes so as to tap a preformed aperture in a workpiece 27 mounted in the spindle position 18. Motive means 30 is provided to establish linear motion of the slide 22, and in this embodiment, the motive means 30 is an air cylinder 31 containing a piston 32. One of these (in this case, the cylinder 31) is fixed to the base 13 and the other (in this case, the piston 32) is connected to move the slide 22. This motive means has first and second conditions to move the tap holder 25 in advance and retract movements, respectively, relative to the workpiece 27.

A motor 35 is mounted on the base 13, and is a variable speed motor. In this case, the motor is an adjustable speed DC electrical motor driving a toothed pulley 36. A cog belt 37 is driven by this toothed pulley, and in turn drives another toothed pulley 38, which is connected to rotate the tap holder 25. In this preferred embodiment, the tap holder 25 is provided with some form of a dog clutch which, in FIG. 1, is rather diagrammatically illustrated as a male member 39 and a female member 40.

First and second fixed stops 41 and 42 are provided to physically limit the advance and retract movements of the slide 22. First and second switches 43 and 44 are provided to be actuated by advance and retract movements of the slide 22. In the preferred embodiment, these switches are proximity switches which are adjustably mounted inside the stops 41 and 42. This protects the proximity switches, and also provides that adjustable stops 45 and 46 for these switches 43 and 44, respectively, will physically cooperate not only with the stop but with the respective proximity switch.

Figure 6:
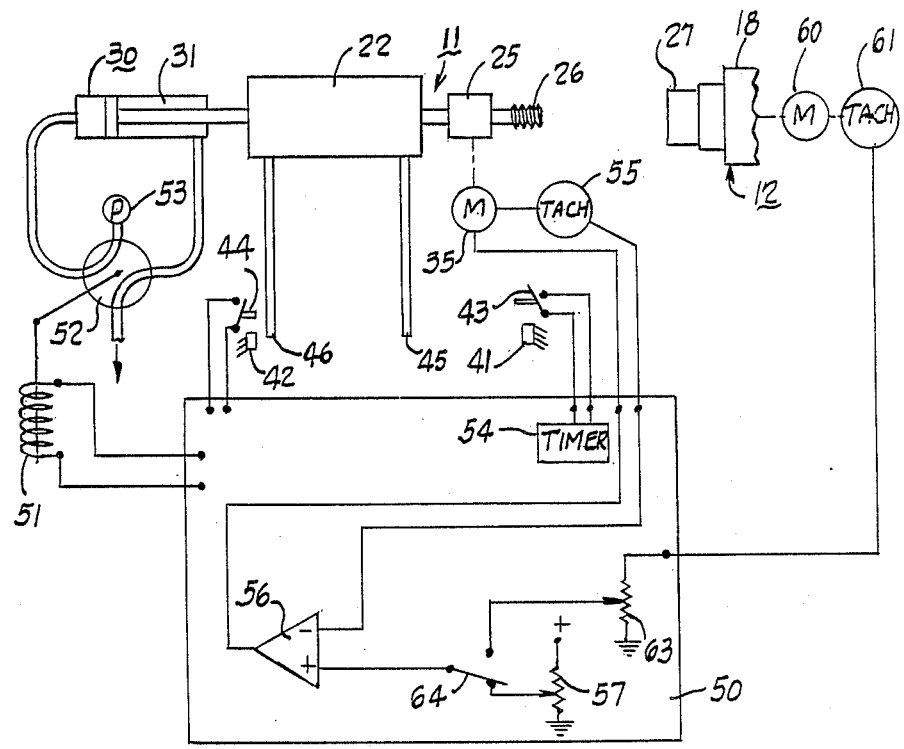
FIG. 6, is a schematic diagram of the control circuit for the threading attachment.

FIG. 6 shows control means 50 and rather diagrammatically shows the structural arrangement of the machine tool 12 and threading attachment 11. The switch 44 is connected to this control means, and switch 43 is connected to a timer 54 within the control means 50. The motive means 30 is controlled by control means 50. This control is via a solenoid 51 and a valve means 52 to direct air pressure from a pressure source 53 to either end of the air cylinder 31. The motor 35 drives a tachometer 55, which is connected to one input of a comparator or difference amplifier 56. A speed control potentiometer 57, which may be calibrated in tapping motor RPM, is connected to the other input of this comparator 56 and the output thereof is connected to control the speed of the motor 35. This assures that this motor 35 will maintain a constant speed regardless of the changes in load, such as tapping and non-tapping. The spindle 18 in the given position is shown as being driven by a motor 60, and, as a modification, this motor 60 may drive a tachometer 61 which is connected to a speed difference potentiometer 63. This may be calibrated in tapping RPM, which is the difference in speed between the tapping motor 35 and the spindle motor 60. The variable tap of this potentiometer is connected through a switch 64 to the other input of the comparator 56. In this way, the speed difference potentiometer 63 will maintain a definite speed difference between the spindle motor 60 and the tap holder motor 35.

Operation

It will be noted primarily from FIG. 2 that the threading attachment 11 is a module which may physically be located in any of the six spindle positions 68 of the machine tool. This adds versatility to the threading attachment. With workpieces in the various spindles and a workpiece 27 at the spindle position 18, the tap 26 is ready to tap a preformed aperture in this workpiece. The threading attachment 11 goes through a cycle of operation which is initiated by a cycle-start switch (not shown) connected to the control means 50. The cycle starts with the tap holder rotating at a first speed, and with the motive means 30 in a first condition. This first condition establishes advance movement of the slide 22 and tap holder 25, so that the tap 26 advances towards the workpiece 27. The motive means 30, being an air cylinder and piston, acts not only as a longitudinal motion for the tap holder, but also acts as a constant force spring which does not change in force regardless of longitudinal position. In the preferred embodiment, this motion is along the axis 24 of the spindle position 18 to tap a coaxial aperture. This constant spring force from the motive means 30 causes the tap to enter the preformed aperture and begin tapping at a rate determined by the rotational speed of the tap 26 compared with the rotational speed of the workpiece 27. In a typical multiple spindle machine tool, this spindle rotational speed might be between 2000 and 3000 rpm.

When the adjustable stop 45 strikes the first stop 41, this arrests the advancing movement of the slide 22 and tap holder 25; however, the rotation of the tap by the motor 35 continues to drive the tap into the workpiece 27. This is an advancing movement of the tap relative to the workpiece, and hence the dog clutch 39,40 begins to separate. At substantially the same time that the adjustable stop 45 engages the first stop 41, this adjustable stop 45 actuates the proximity switch 43. This starts the timer 54, but nothing else changes. The time-out period of the timer 54 is set so that the dog clutch 39,40 will separate prior to timing out of this timer. This time period might be 1/5 to ½ second, as an example. When the dog clutch separates, the tap 26 becomes free-running, independently of the tap holder 25, and it then rotates directly with the workpiece 27, tapping no deeper. When the timer 54 times out, this makes two changes. It controls the motive means 30 to establish it in a second condition of retract movement of the tap holder, and also changes the motor 35 to a second speed. The second speed is selected to be one to rotatably back the tap out of the workpiece 27. Thus, a collapsible tap or expandable die is not required for this threading attachment 11.

In this threading attachment 11, the motor 35 is an electrical DC motor capable of reverse rotation and variable speed in each direction, so that if cross-threading is required, the motor may run in one direction for tapping at any desired speed, and run in the opposite direction for tap back-out, again at any desired speed. In the preferred embodiment, with the threading attachment mounted for coaxial tapping on the workpiece 27, the rotational speed of the workpiece is taken into account. If the workpiece is rotating at 2500 rpm, for example, the tap 26 might be rotated at 2000 rpm in the same direction for tapping, and then accelerated to 4000 rpm in the second speed condition, to back the tap out of the workpiece. In this embodiment, the motor does not need to reverse direction; it merely speeds up to back the tap out of the work. After the tap has been backed out of the now-threaded workpiece, the motive means 30 will quickly retract the tap holder 25 to the adjustable stop 46 which engages the stop 42 for a definite at-rest position of the threading attachment slide 22. This adjustable stop 46 also actuates the second proximity switch 44, which stops the motive means 30, and switch 44 acts as a safety switch which must be actuated to allow the multiple spindle machine tool 12 to index. It also may stop the electric motor 35, but in the preferred embodiment, it merely changes it back to the first speed condition, ready for the next cycle of operation. The tap holder 25 in this preferred embodiment is a non-reversing releasing tap driver wherein re-engagement for retraction occurs instantaneously upon reversal of the rotation of the tap holder relative to the workpiece. Other tap holder arrangements may be utilized in this threading attachment 11.

It will be noted that the threading attachment 11 is modular and is solely contained within the tooling area of the machine tool 12. There is an infinite range of speeds of the tap holder motor 35 within the given range, so that the optimum surface feet-per-minute tapping speed may be achieved, and the optimum tap withdrawal rate may be achieved. If one is utilizing a large tap in a hard material, such as steel, then a low feet-per-minute tapping rate, such as 40 feet per minute, might be selected. On the other hand, if one is utilizing a small tap, such as a ⅛-inch diameter tap, in soft material like aluminum, then one might select 120 feet per minute as a tapping speed. The tap withdrawal rate may be selected at the fastest possible without damaging the threaded workpiece, so as to minimize the machine cycle time. The air cushioning effect of the air cylinder 31 provides clean cutting action so that there is no shaving on either the front or the rear flank of the threads. Also, this motive means 30 eliminates the friction of longitudinal movement of the slide 22 so that the tap is free to advance at its own tapping speed relative to the workpiece. The entire threading attachment 11 being solely within the tooling area, it is readily adaptable to machine tools of various frame sizes, without requiring any changes to the mechanism, as in the prior art structures, which could be used with only a single frame size.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. A tapping attachment for the tooling area of a multiple spindle machine tool comprising, in combination:
    a base adapted to be attached to the frame of a multiple spindle machine tool in a given spindle position of the machine tool;
    a rotatable tap holder;
    means movably mounting said tap holder on a slideway on said base for motion relative to a spindle in said given position;
    said tap holder adapted to carry a tap for operation on a workpiece in said given spindle position of the machine tool;
    motive means having first and second conditions to move said tap holder in advance and retract movements, respectively, relative to a workpiece in said given spindle position;
    a motor connected to rotate said tap holder at infinitely variable speeds within a given range, including first and second speeds;
    a switch mounted to be actuated by an advanced position of said tap holder; and
    control means connected to said switch (a) to establish said motor first speed and said motive means first condition to tap an aperture in the workpiece, and (b) to establish said motor second speed and said motive means second condition to retract the tap holder and back the tap out of the workpiece.

2. A tapping attachment as set forth in claim 1, wherein said mounting means mounts said tap holder for movement along the axis of said given spindle position.

3. A tapping attachment as set forth in claim 1, wherein said tap holder includes a dog clutch disengageable by advance movements of the tap relative to said tap holder.

4. A tapping attachment as set forth in claim 1, wherein said motor is an electrical DC motor capable of reversible rotation at infinitely variable speeds within a given range.

5. A tapping attachment as set forth in claim 1, wherein said motive means is a piston inside an air cylinder with one thereof connected to said base and the other thereof connected to said tap holder.

6. A tapping attachment as set forth in claim 5, wherein said control means includes valve means to control said motive means.

7. A tapping attachment for the tooling area of a multiple spindle machine tool comprising, in combination:
    a base adapted to be attached to the frame of a multiple spindle machine tool in a given spindle position of the machine tool;
    a rotatable tap holder;
    means movably mounting said tap holder on said base for motion relative to a spindle in said given position;
    said tap holder adapted to carry a tap for operation on a workpiece in said given spindle position of the machine tool;
    motive means having first and second conditions to move said tap holder in advance and retract movements, respectively, relative to a workpiece in said given spindle position;
    a motor connected to rotate said tap holder at infinitely variable speeds within a given range, including first and second speeds;
    a switch mounted to be actuated by an advanced position of said tap holder; and
    control means connected to said switch and including a timer actuated by said switch with said timer connected to control said motor (a) to establish said motor first speed and said motive means first condition to tap an aperture in the workpiece, and (b) to establish said motor second speed and said motive means second condition to retract the tap holder and back the tap out of the workpiece.

8. A tapping attachment for the tooling area of a multiple spindle machine tool comprising, in combination:
    a base adapted to be attached to the frame of a multiple spindle machine tool in a given spindle position of the machine tool;
    a rotatable tap holder;
    means movably mounting said tap holder on said base for motion relative to a spindle in said given position;

said tap holder adapted to carry a tap for operation on a workpiece in said given spindle position of the machine tool;

motive means having first and second conditions to move said tap holder in advance and retract movements, respectively, relative to a workpiece in said given spindle position;

a motor connected to rotate said tap holder at infinitely variable speeds within a given range, including first and second speeds;

a switch mounted to be actuated by an advanced position of said tap holder; and control means connected to said switch and including a timer actuated by said switch with said timer connected to control said motive means (a) to establish said motor first speed and said motive means first condition to tap an aperture in the workpiece, and (b) to establish said motor second speed and said motive means second condition to retract the tap holder and back the tap out of the workpiece.

9. A tapping attachment as set forth in claim 8, wherein time-out of said timer changes said motive means to said second condition and the timer is connected to said motor to change it to said second speed.

10. A tapping attachment as set forth in claim 9, including a physical stop engageable to stop movement of said tap holder at substantially the same time as actuation of said switch, and a dog clutch in said tap holder disengageable by advance movements of the tap relative to said tap holder.

11. A tapping attachment as set forth in claim 10, wherein pull-apart of said dog clutch establishes the tap as free-running independently of said tap holder.

12. A tapping attachment as set forth in claim 11, including a second switch actuated by a retract movement of said tap holder and connected to said control means to stop said motive means at an at-rest position and to establish said first motor speed.

13. A tapping attachment as set forth in claim 1, including a cog belt drive from said motor to said tap holder.

14. A tapping attachment as set forth in claim 1, wherein said tap holder is coaxial with said given spindle position, and said control means establishes said motor second speed at a rate higher than said first speed and in the same direction.

* * * * *